United States Patent Office 3,070,969
Patented Jan. 1, 1963

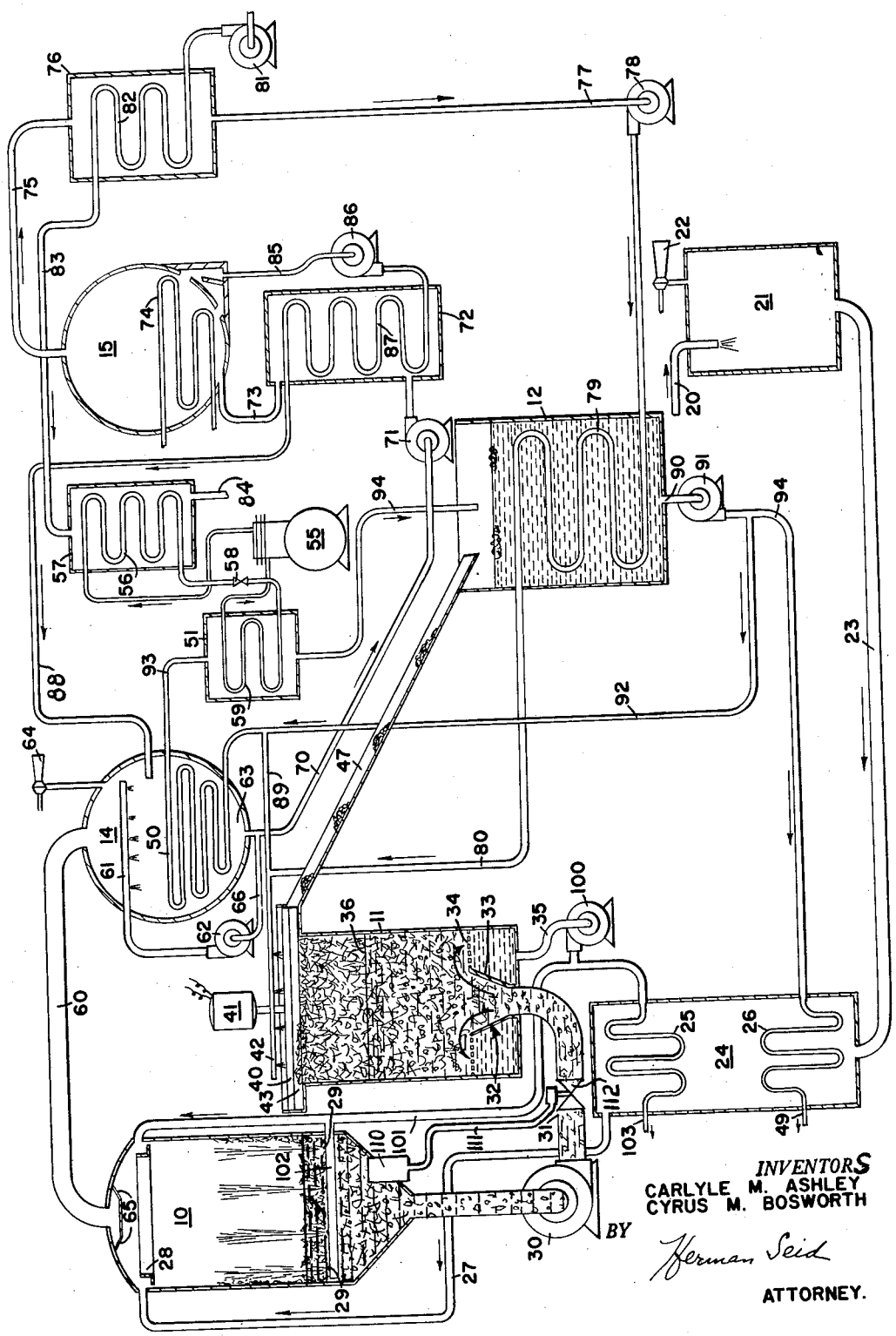

3,070,969
SEPARATION SYSTEMS
Carlyle M. Ashley, Fayetteville, and Cyrus M. Bosworth, Syracuse, N.Y., assignors to Carrier Corporation, Syracuse, N.Y., a corporation of Delaware
Filed July 11, 1960, Ser. No. 42,008
24 Claims. (Cl. 62—58)

This invention relates to separation systems and more particularly to systems for the separation of the solvent and solute components of a solution by utilization of a freezing process. This invention further relates to the freezing of the solvent component from a solution and to the separation of the solid and liquid components of a slurry. This application is a continuation in part of our copending application Serial No. 28,759, filed May 12, 1960, now abandoned.

In the past, various freeze processes have been proposed for separting dissolved salts from a solvent solution thereof such as, for example, removing salt from sea water to render it potable. Basically, the principle of operation of a freeze process involves the freezing of a raw solution so as to concentrate solute salts in the liquid component of the solution and to collect the solvent component of the solution in the form of frozen solvent material. The frozen solvent must then be separated from the concentrated salt solution by an appropriate means. In the past, this separation step has presented serious difficulties in the operation of a high capacity continuous separation process.

The use of various centrifugal and mechanical separators has been proposed to perform the separation step in a freeze process. Where the specific gravities of the solute solution and frozen solvent permit, it has been suggested to employ a gravity separation column wherein the frozen solvent is removed from the top of the column and the concentrated solute salt solution is removed from the bottom of the separation column. However, in this as well as other proposed separation apparatus, it has been found that the amount of separation obtained is limited by the fact that a substantial quantity of concentrated salt solution adheres to the surface and in the interstices of the frozen solvent. If the object of the process is primarily to recover the solvent such as in a saline water conversion system, the salt remaining on the surfaces and in the interstices of the frozen solvent constitutes a contaminant which must be removed to make the process effective for its desired purpose. On the other hand, if the object of the process is to recover the concentrated salt solution, a substantial loss of capacity may result from the carryover of the desired product with the frozen solvent. The magnitude of the problem will be appreciated when it is pointed out that ice frozen out of a brine solution will retain nearly an equal quantity by weight of brine on its surface and in its interstices. It, therefore, becomes necessary to develop a separator which provides the least practicable amount of contamination in the desired product for a freeze separation process to become commercially feasible.

Another serious problem which is encountered in prior practical separation systems of the type described is that of providing a separator of reasonable size which is capable of continuous high capacity operation. For example, in the gravity separation column type of separator, even assuming that adequate separation takes place, the capacity of a practical size column is relatively small due to the low velocity of solid component in the column. The velocity of the solid component in a separation column is limited by the pressure drop through the column and in a gravity separation column this pressure drop cannot exceed the buoyant force of the solid or in other words, weight of the solid buoyed up above the liquid level under static conditions. Consequently, an effective gravity separation column in a large scale saline water conversion process, for example, may be required to have a diameter which is substantially larger than the diameter of the required freezer vessel. It will be appreciated that the mere cost of constructing a separation column of such a size would render a larger scale process impractical and uneconomical.

Another problem in the development of an efficient and economical separation plant is the design of an effective freezer which is adapted to freeze relatively large amounts of solvent from a solution containing the solvent and a solute. Various prior proposals have recognized the need to provide a relatively large amount of surface to obtain effective freezing. Many prior art constructions have tended, therefore, to be physically large and expensive and frequently have failed to make effective use of the power input to the separation system.

An additional problem encountered in the design of an effective freezer resides in the tendency of a solution to exhibit metastability at, or slightly below, its freezing point. That is, the solution undesirably remains liquid in a supercooled or supersaturated condition. In an efficient freezer, it is obviously desirable for the solvent component of the solution to freeze immediately upon reaching its freezing temperature since otherwise a substantial amount of energy is required to reduce the temperature of the solution to a point where the solvent component begins to freeze.

Accordingly, it is an object of this invention to provide an improved freeze separation process and system.

It is a further object of this invention to provide an improved method of operating a separation column.

It is a still further object of this invention to provide an improved freezer and an improved method of freezing the solvent component from a solution containing a solvent and a solute.

These and other objects of this invention are achieved in the illustrated embodiment by vacuum freezing the solvent component of a solution from the solution in a freezer vessel. A slurry of frozen solvent and concentrated solute solution is then passed to a separation column under pressure. The frozen solvent is consolidated into a mass having relatively low permeability and is forced through the column by hydraulic pressure. At the same time, the concentrated solute component of the slurry is removed from the column separately from the frozen solvent component. Since a separation column, of this type depends upon hydraulic pressure for its operation, the capacity of the column is not limited by the pressure drop due to the buoyancy of the solid component as in a gravity separation process and consequently, the frozen solvent may pass through the column with a relatively large velocity thereby requiring only a relatively small column for handling a given rate of production.

In the embodiment described, the separation column is vertical and a consolidated mass of frozen solvent is continuously forced vertically upwardly in the column so that a substantial mass of frozen solvent may lie above the level of liquid in the column. By this means, there is achieved much more effective drainage of liquid component from the consolidated mass of solid component of the slurry which is fed to the column than could be achieved if the solid component were required to float on the surface of the liquid and, therefore, only a lesser height of solid component would remain above the liquid level in the column. Furthermore, in a system of the type described, it is unnecessary that the solid component of the slurry fed to the column have any particular specific gravity in relation to the liquid component and it is entirely feasible to separate a relatively heavier solid from a less dense liquid in such a column.

A freezer vessel is provided having a liquid header disposed adjacent a lower portion thereof and a plurality of upwardly directed nozzles in communication with the header. Means are provided to recirculate solution which is separated from the slurry in the separation column to the liquid header in the freezer vessel under sufficient pressure to discharge the solution through the nozzles and upwardly in the freezer vessel. The nozzles are located below the level of liquid or slurry in the freezer vessel and as the solution is fountained upwardly in the freezer, it is forced above the level of slurry in the freezer which is, of course, also the level of the solution in the freezer. This action induces a substantial quantity of slurry upwardly with the solution above the level in freezer vessel. By this means, a substantial area of solution is presented to the reduced pressure in the interior of the freezer for evaporative freezing and in addition, inherent metastability of the solution is reduced both by agitation and by contact of solution with frozen solvent. If desired, liquid level control means may be provided to assure that the nozzles will be submerged below the level of liquid or slurry in the freezer vessel by a predetermined amount.

The method of freezing solvent from a solution herein described involves the steps of admitting solution into a freezer vessel, either through the plurality of submerged nozzles in the freezer or through another inlet or both, producing a slurry of solution and frozen solvent in the freezer by evacuating the freezer vessel to a pressure which is slightly below the vapor pressure of the solution therein, and admitting additional solution to the freezer vessel through the submerged nozzles under a sufficient differential presure with respect to that maintained in the freezer so as to create a fountain of solution and induced slurry which rises above the general level of solution and slurry within the freezer.

An additional advantage achieved in the illustrated embodiment resides in the ease of effecting relatively complete separation of the solid and liquid components of the slurry and for this purpose a washing fluid is distributed over the surfaces of the consolidated solid component in a manner such that it moves in counterflow relation to the movement of solid component through the column thereby replacing liquid component which tends to adhere to the surfaces and interstices of the solid component. The result is that solid component reaching the top of the column may be harvested in a relatively dry condition and substantially free of adhering liquid component because of the washing and draining action.

These and other advantages of this invention will be more completely understood by reference to the following specification and attached drawing wherein the FIGURE is a schematic representation of a freeze separation process embodying a separation column in accordance with this invention.

The major components of the system described are a freezer vessel 10, a separation column 11, a melting vessel 12, an absorber 14, a generator 15 and various associated refrigeration and heat exchange components.

This invention will be specifically described with reference to a process for the conversion of a saline water solution such as sea water or brackisk river water into fresh water. However, it should be understood that the process described is equally applicable to the separation of any dissolved solute material from a solvent solution thereof, whether the end product of the process which it is desired to recover is to be solvent, solute or both. Likewise, while the separation column will be described with reference to a frozen material such as ice in the example given, it should be understood that the process employed is equally applicable to the separation of any solid, and, therefore, broadly speaking, frozen material, from the liquid component of a slurry whether or not the solid material is capable of being dissolved in the liquid to any great extent.

A solution intake line 20 for raw solution, which in this case may be sea water, provides an inlet into deaerator vessel 21 which is provided with a suitable purge 22. Deaerator 21 serves to remove dissolved gases from the raw solution which if allowed to remain therein might adversely affect the efficiency of the freeze process to be subsequently described. Solution line 23 carries deaerated raw solution to a heat exchanger 24 which contains heat exchange coils 25 and 26 whereby incoming raw solution is passed in heat exchange with the relatively cool product liquids leaving the system. Solution line 27 carries raw solution which has been cooled in heat exchanger 24 to flush ring 28 of freezer vessel 10. Freezer vessel 10 is also provided with a plurality of submerged nozzles 29 below the level of liquid in the freezer. Freezer 10 is evacuated to the flash pressure of the solution therein by withdrawal of vapor from the freezer through vapor line 60 thereby causing solvent to freeze out of the solution in the vessel.

As will be observed from the drawing, freezer vessel 10 comprise a generally upright or vertically disposed shell having a liquid header 102 disposed adjacent a lower portion thereof. A plurality of nozzles 29 communicate with the interior of header 102 and are directed in a generally upward direction from the header. Nozzles 29 may preferably comprise short tubular extensions secured to header 102. Concentrated solute solution pump 100 recirculates a fraction of the liquid component which comprises concentrated solution from separation column 11 through line 101 to header 102. As also shown in the drawing, pump 100 provide sufficient pressure to discharge the liquid solution from the separation column upwardly above the level of liquid or slurry which is present in freezer vessel 10. It will be observed from the drawing that nozzles 29 and header 102 are disposed or submerged below the level of the liquid or slurry in freezer 10. Consequently, the action in discharging solution through nozzles 29 upwardly in the freezer vessel induces a substantial quantity of slurry upwardly in freezer vessel 10 along with the solution which is discharged through the nozzles.

In practice, it has been found that for a freezer adapted to freeze water from a brine solution such as sea water which has been concentrated to approximately 7% dissolved salts that a pressure is required in the freezer of approximately .058 pound per square inch absolute. Under these conditions, when using a plurality of nozzles 29 having an orifice diameter of approximately three-sixteenths of an inch which are located about one inch below the level of slurry in the freezer, it has been found that a pressure difference of between five and 15 pounds per square inch, exerted by pump 100 on the brine recirculated through nozzles 29, is sufficient to discharge the resulting brine and slurry mixture about six feet above the level of the slurry in the freezer. Also, under these conditions, a substantial amount of slurry in freezer vessel 10 is induced upwardly in the fountain of discharged solution. The ratio of induced or entrained slurry to solution discharged through nozzles 29 may range between 1:1 to about 3:1 under the conditions described.

It will be understood that any suitable pressure is applied to the solution removed from the separation column 11 which is sufficient to discharge it through line 101, header 102 and nozzles 29 to provide the desired fountain or upward discharge of solution and slurry above the level of the liquid or slurry in freezer vessel 10. The amount of pressure which is applied to this solution will vary according to the physical design of the nozzles and the freezer vessel as well as with the height of slurry above the nozzles. While it is said that this solution is under pressure, it will be understood that the pressure is a differential pressure and is relative to the absolute pressure in the freezer vessel, which is maintained substantially at, i.e., slightly below, the vapor pressure of the solution therein. Consequently, the pressure of the solution ejected through the nozzles may actually be less than atmospheric depending upon the conditions of operation of the freezer.

The construction and method of operation described has been found to result in highly efficient freezing for two reasons. First, the fountain of discharged solution and induced slurry which rises upwardly in freezer 10 above the surface of the slurry therein, presents a substantial area in contact with the vapor at a reduced pressure within the freezer vessel. This promotes rapid evaporation and cooling of the solution within the freezer and therefore promotes freezing of the solvent component of the solution. Secondly, the inherent metastability of the solution is substantially reduced or virtually eliminated by reason of both the agitation which is provided by the fountain within the freezer and also the large amount of frozen solvent i.e., ice, which is in contact with the solution which is discharged upwardly in the freezer.

If desired, a liquid level control, schematically illustrated in the drawing, may be provided to cooperate with the freezer vessel so as to maintain the level of liquid or slurry in the freezer vessel at a predetermined height above nozzles 29 of header 102. The means provided to achieve this function may comprise a pressure or level sensitive element 110 located adjacent the lower portion of freezer vessel 10, an electrical or pneumatic connection 111 and a valve 112 located in the slurry line 31 which discharges into separation column 11. The pressure sensitive element 110 thereby control the operation of valve 112 to maintain a predetermined level of slurry or liquid in freezer vessel 10. Alternatively, a weir or other liquid or slurry level control may be provided if desired in the freezer vessel.

A slurry of frozen solvent, which in the example described constitutes water, and concentrated solute solution, which in this case constitutes brine, is passed to the preferably vertical tubular body of separation column 11 by slurry pump 30 through slurry line 31. Slurry line 31 communicates with separation column 11 through an opening in the lower portion adjacent one end of the column. A slurry distributor 32 is provided in the lower end of the separation column and in the illustrated embodiment comprises a funnel 33 and a fine mesh screen or filter means 34 extending radially to the inner wall of the body of separation column 11. Screen 34 is chosen to have a mesh of a size which inhibits or substantially prevents the solid or frozen solvent component of the slurry from passing through it, while at the same time it allows flow of the liquid or concentrated solute component from distributor 32 to a liquid outlet 35 which is located adjacent the base of the column.

For purposes of illustration, slurry distributor 32 is shown to comprise a cone shaped funnel surrounded by a horizontal annular screen. It is to be understood, however, that this specific configuration represents only one of a number of distributor constructions which may be advantageously employed adjacent the lower end of separation column 11. Various distributor constructions, the geometry of which may be dependent to some extent on the size and orientation of separation column 11, will be found useful for the purposes of this invention. Likewise, separation column 11 need not necessarily be oriented vertically but may be placed in a horizontal position and in some instances, it may be desirable to position the slurry inlet adjacent the upper end of the separation column rather than the lower end as shown in the preferred embodiment.

The important considerations in the design of a separation column suitable for use in the described process will be considered in detail. First, it is necessary to provide a means for introducing slurry into the separation column. Preferably this means should be an inlet opening located adjacent one end of the separation column. However, in some cases it may be desirable to introduce the slurry into the column by forming it therein as by freezing a solution in the column. In this case the inlet comprises merely a region of the separation column wherein the solid and liquid components of the slurry are present. Second, in order for the separation column to properly perform its function, it is necessary that there be an excess of pressurized liquid at some region in the separation column in addition to that quantity of liquid which tends to adhere to the surface of the solid component of the slurry. It is entirely feasible to operate the separation column at an absolute pressure which is either above or below or at atmospheric pressure but, as will presently appear, it is necessary that there be produced a pressure drop through the inlet region in the column where the excess liquid in the solid component of the slurry tends to consolidate so as to provide a driving force to move the solid component through the column. Third, the excess of liquid must be withdrawn from the slurry in the separation column at a point intermediate its ends such that a pressure drop is produced in the column through the slurry inlet region. This condition also requires that the liquid being withdrawn must flow at least partially in the same direction as the desired movement of solid component in the inlet region of the separation column. It also follows that the concurrently flowing liquid must have a greater velocity through the consolidated mass in the inlet region than that of the mass itself. As has been previously suggested this inlet region of the separation column through which the pressure drop occurs need not be physically located in the body of the column but may actually be located in the slurry line or in the distributor means or in the body of the column or in a combination of these regions all of which may be functionally regarded as an inlet region of the separation column.

Considering the effect of these requirements on the operation of the separation column, it will be observed that a slurry comprising solid and liquid components is introduced into the separation column at a higher pressure than the liquid discharge pressure. The solid component of the slurry tends to consolidate into a mass having a relatively low permeability with respect to the slurry due to the removal of the liquid component from the slurry and the application of force due to the pressure drop through the inlet region. The concurrent flow of liquid in the inlet region resulting from removal of liquid also causes a pressure drop to exist across the consolidated mass of solid component. Consequently, a net force acting on the consolidated mass of solid component is present in the column which causes the solid component to move in a predetermined direction. Since additional solid component is continuously being added adjacent one end of the column, and liquid component is continuously being removed from the column, the force acting on the consolidated mass in the region of the slurry distributor forces the solid component through the column where it is eventually discharged therefrom.

In the case of the slurry distributor illustrated in the drawing, a pressure created by slurry pump 30 acts upon the lower surface of solid component in funnel 33. Liquid component is drawn through the low permeability mass of solid component and through screen 34 which is located intermediate the ends of the separation column in the direction of the arrows shown in the drawing. Solute solution or liquid component pump 100 continuously removes the liquid component from the column through screen 34 and outlet 35. The resulting pressure drop across funnel 33 produces a net force acting on the mass of solid component in the funnel to force the solid component upwardly. Movement of solid component upwardly in funnel 33 forces the solid component in the body of separation column 11 upwardly and the result is an overall movement of the consolidated solid component through the separation column.

Located at the top or other end of separation column 11 is a discharge means for solid component comprising an opening, with a scraper and sprayer assembly 40 driven by motor 41 located above the opening. As solid component is forced by hydraulic pressure up through separation column 11, sprays distribute a washing fluid over the surfaces of the solid component and pass the washing fluid in counterflow to the movement of the solid component through the column to wash it free from liquid component adhering to the surfaces and interstices thereof. At the same time, blades 43 scrape a portion of the consolidated solid component in column 11 from the top of the column and pass it to chute 47. Motor 41 is employed to rotate blades 43 so as to harvest solid component which passes upwardly to the top of the separation column. Solid component which has been scraped from the top of column 11 passes down chute 47 by gravity where it is collected in melting vessel 12. Melting vessel 12 is provided with purified solvent outlet 90 adjacent its lower portion. Suitable means, which will be subsequently described, are provided for melting the solid component in vessel 12.

Solvent pump 91 serves to remove melted purified solvent from melting vessel 12 and pass it through solvent lines 92 and 93 which comprise a first branch line for purified solvent and to solvent line 94 which comprises a second branch line for purified solvent. Line 94 passes relatively cool liquid solvent through heat exchange coil 26 of heat exchanger 24 where it is discharged from the system through product outlet 49. The other portion of purified solvent is conducted through line 92 to heat exchange coil 50 located in absorber 14 where it is employed to cool an absorbing medium. This fraction of purified solvent, which has picked up a quantity of heat in absorber 14, is then conducted through line 93 into heat exchanger 51 where some of its heat is removed. The cooled purified solvent in this branch line is then discharged through line 94 onto the surface of frozen solvent in melting tank 12 where it serves as a melting agent. Line 92 also serves to supply a portion of the melted solvent through line 89 to spray system 43 where it is distributed over the mass in the top of column 11 and serves as a washing agent. It will be appreciated that if the desired washing fluid comprises other than melted solvent, that other suitable means will be provided to supply the washing fluid for distribution over the solid mass in column 11.

A refrigeration system of relatively conventional type comprises compressor 55, condenser coil 56 in heat exchanger 57, expansion device 58 and evaporator coil 59 located in heat exchanger 51. The refrigeration components are connected in series relation and serve to cool purified solvent passing into heat exchanger 51 through line 93 to restore the heat balance in the system. The operation of a refrigeration circuit of this type is conventional in the art and will not further be described.

As previously described, freezer 10 is evacuated initially by operation of purge 64 and thereafter by withdrawal of solvent vapor due to absorption thereof by absorbent solution in absorber 14, in order to provide flash freezing of raw solution in the freezer. Vapor line 60 is in communication with the upper portion of freezer vessel 10 and is employed to conduct vapor from the freezer to absorber 14. Eliminators 65 may be provided to substantially prevent the carry-over of entrained moisture from freezer 10 through vapor line 60. Absorber 14 is provided with a spray system 61 which is fed by a recirculating spray pump 62 through line 66 which is in communication with sump 63 of the absorber. Pump 62 serves to remove absorbent solution from sump 63 and pass it through a plurality of spray nozzles in spray system 61 of heat exchange coil 50 where the absorbing medium is cooled in order to increase its capacity to absorb vapor passing through vapor line 60. A suitable purge 64 is provided to remove air or other noncondensibles from absorber 14.

The absorbing medium which is employed to remove solvent vapor, which in the case of the process described is water, may conveniently comprise a relatively concentrated solution of lithium bromide. Since, however, even a relatively concentrated solution of lithium bromide would soon be diluted by vapor passing from freezer 10 through vapor line 60, it is necessary to provide a reconcentrator for the absorbent in absorber 14. For this purpose, dilute absorbent line 70 communicates with sump 63 of absorber 14 and passes dilute absorbent to heat exchanger 72. Dilute absorbent pump 71 may be provided to assist in the transfer of dilute absorbent. Generator inlet line 73 conducts dilute absorbent entering heat exchanger 72 to the inlet of generator 15. A steam coil 74 is located in the lower portion of generator 15 and serves to fractionally distill the absorbed solvent from the absorber liquid. In the case described, water vapor is boiled out of the lithium bromide or other absorbent solution and the concentrated lithium bromide absorbent is passed by pump 86 through strong absorbent line 85 to heat exchange coil 87 in heat exchanger 72. From there, strong absorbent discharge line 86 conducts the cooled absorbent, which has given up part of its heat to incoming weak absorbent in heat exchanger 72, back to absorber 14 for reabsorption of additional solvent vapor.

Solvent vapor which has been distilled from the absorbent in generator 15 is passed through line 75 to heat exchanger 76 where it is condensed and passed by pump 78 through line 77 to heat exchanger 79 located in melting vessel 12. In heat exchanger 79, the warm condensed vapor gives up a portion of its heat to further aid in the melting of frozen solvent in melting vessel 12. The cooled absorbed liquid which constitutes substantially pure solvent liquid is then passed through condensate line 80 to sprays 42 where it serves as a washing fluid to replace solute contaminated solution which may adhere to the surfaces of the solid or frozen component passing upwardly through separation column 11. It will be noted, therefore, that while the solid component which is harvested from the top of separation column 11 may have a certain amount of liquid adhering to the surfaces and in the interstices thereof, that this liquid comprises substantially pure solvent which has been used as a washing fluid and consequently, the harvested solid component may be substantially free of contamination.

A source of cooling liquid is provided to heat exchange coil 82 in heat exchanger 76 by pump 81 from which it passes through line 83 to heat exchanger coil 56 in heat exchanger 57. The warmed cooling liquid is then discharged through line 84.

Concentrated solute solution pump 100 recirculates a fraction of the liquid component removed through liquid outlet of separation column 11 through line 101 to flush ring 28 and spray header 102 in freezer vessel 10 to maintain the desired solvent concentration in the freezer. Another portion of the solute solution removed from column 11 is passed through heat exchange coil 25 in heat exchanger 24 and is discharged from the system through discharge outlet 103.

The operation of the separation system will be described with reference to the conversion of sea water to potable water by the extraction therefrom of dissolved salts although it will be appreciated that the invention is not limited to this type of process. In such a system, sea water enters in line 20, is deaerated by deaerator 21, passed through line 23 to heat exchanger 24 where it is cooled nearly to the temperature of the discharged solution in heat exchange coils 25 and 26. Raw sea water then passes through line 27 to flush ring 28 where it drains down the side of freezer vessel 10, keeping the sides at all times washed free of ice. Freezer 10 is evacuated of water vapor through line 60 to the flash pressure of the cooled sea water in the freezer.

Consequently, a mixture of ice and brine form in freezer 10 and a slurry of ice and brine is pumped by slurry pump 30 to slurry distributor 32 of separation column 11.

The particles of ice in the slurry begin to build up and consolidate into a mass of relatively low permeability in funnel portion 33 of distributor 32. Slurry pump 30, however, continues to exert a substantial hydraulic pressure on the under side of the ice mass in the separation column. Since the ice mass has relatively low permeability, the brine component of the slurry will tend to take the path of least resistance and which in the case of the column described, is a relatively short path through the lower portion of the consolidated ice. After having passed concurrently through the consolidated mass in the inlet region, the concentrated brine solution will escape through the fine wire mesh screen 34 to outlet 35. Screen 34, however, is of a sufficiently fine mesh such that the consolidated particles of ice on its upper surface will not pass in substantial quantities through the screen. Therefore, the concentrated brine will be removed from the separation column through outlet 35 while the ice remains in the column.

A liquid level 36 is shown part way up in the separation column 11. However, it is to be noted, that the consolidated mass of ice in the column is not floating on the surface of the liquid, but rather it is being pushed up through the liquid by the hydraulic pressure applied to its under side by a slurry pump 30. Any desired means may be used to supply hydraulic pressure to the under side of the consolidated mass of solid material in separation column 11, but since a slurry pump 30 is desirable for passing the slurry to the column, it is convenient to use the slurry pump as the means for applying hydraulic pressure to the ice mass adjacent the lower end of the separation column. The ice as it passes above liquid level 36 is drained of brine to some extent, but because of the surface tension of the remaining brine, adequate separation of ice and brine may not be achieved by drainage alone. On the other hand, because the liquid level 36 is much lower in the column than it would if the ice were floating on the liquid that drainage which does take place is markedly more effective than it would be in a "floating column."

As the ice passes upwardly in the separation column 11, fresh water is discharged adjacent the upper end of the column and passes downwardly in counterflow relation to the upward movement of ice in the column. This relatively pure water replaces the brine which tends to adhere to the surfaces and in the interstices of the ice by a displacement or a diffusion mechanism and consequently removes the contaminated brine from the ice as it reaches the upper portion of the separation column. In general, it may be said that the lower liquid level 36 is in column 11, the more complete the washing operation may be, and operating the column with a relatively low liquid level provides the additional advantage of allowing substantial time for the excess wash water which is discharged over the surface of the ice in the column to drain free of the ice before it is harvested by the rotating scraper assembly 40. In actual practice, it has been found desirable to actually secure spray nozzles 42 to blades 43 at an angle thereto so as to discharge water at an angle over the ice in the separation column in order to achieve highly effective washing. The effect of this arrangement is to intermittently feed washing fluid to the solid component and at the same time, by constructing the scraper blades to precede the sprayer, relatively dry ice may be harvested from the column.

The harvested ice fall down chute 47 into melting tank 12 where it is melted and becomes relatively pure water which, under proper operation of the system, may have any desired purity and be suitable for drinking or manufacturing purposes. The fresh water produced by melting ice in melting vessel 12 is divided into two fractions, one of which passes through heat exchange coils 26 and is discharged through product outlet 49. Since the water produced by melting ice in melting vessel 12 is relatively cool, it absorbs a portion of the heat of the raw sea water in heat exchanger 24, lending efficiency to the process. The other component of fresh water from melting vessel 12 is used to cool lithium bromide in absorber 14, is then recooled by heat exchange coil 59 which is the evaporator coil of a mechanical refrigeration system, and is then discharged back into melting vessel 12 to aid in melting the ice therein.

Concentrated lithium bromide is contained in sump 63 of absorber 14 and is a characteristically hygroscopic material. Consequently, it absorbs substantial quantities of water vapor from freezer 10 through vapor line 60 and results in evacuating freezer 10 to the flash pressure of the sea water or brine solution therein. The capacity of lithium bromide solution for absorption of water vapor is improved through cooling the lithium bromide solution by recirculating a portion of it from sump 63 through spray system 61 over relatively cold heat exchange coils 50. A fraction of the lithium bromide solution in sump 63 which is diluted by absorption of water vapor from freezer 10 is passed through line 70, warmed in heat exchanger 72 and pumped by pump 71 into generator 15.

Steam supplied to steam coil 74 in generator 15 boils off the water component of the diluted lithium bromide solution thereby concentrating the lithium bromide. The concentrated lithium bromide is then passed back through heat exchanger 72 where it is cooled by the incoming weak solution from which point it is passed back to absorber 14 for reabsorption of additional water vapor.

A valuable byproduct of the reconcentration of the lithium bromide is the recovery of the water vapor which was absorbed by it. This water vapor passes through line 75 where it is condensed in condenser or heat exchanger 76 and then pumped through line 77 by pump 78 through heat exchanger 79 where it serves to melt the ice in the melting vessel. The cooled fresh water is then passed through line 80 and discharged onto the ice in separation column 11, being discharged thereon through spray nozzles 42.

The brine component of the slurry in separation column 11 is removed through outlet 35 where it is divided into two fractions, one of which is returned to freezer 10 in a quantity sufficient to maintain the desired concentration for optimum operation of the freezer, for example 7% salts, and the other fraction of the brine is discharged through outlet 103, after having passed through heat exchange coil 25 to further cool the raw incoming sea water.

It will be appreciated that by utilizing a hydraulic separation column of the type described, that the capacity of a relatively small separation column is greatly increased due to the much higher ice velocity that is obtainable than could be obtained through the use of gravitational separation alone. Consequently, a column of this type makes feasible a continuous saline water conversion process which would otherwise be greatly limited by the size of the required separation column of other types. At the same time, highly effective separation of ice and brine is achieved and within practical limits, any desired reduction in the salt concentration of the incoming sea water may be achieved. For example, the process of the type described employing a hydraulic column has been successfully operated to reduce the concentration of salt in raw brine fed to the freezer from approximately 35,000 parts per million down to 100 parts per million with highly satisfactory operating economy.

It will be seen that concentrated brine from separation column 11 is passed under pressure (relative to the pressure in freezer vessel 10) by pump 100 through line 101 to header 102. The concentrated brine is discharged through upwardly directed submerged nozzles 29 above the level of slurry in freezer 10 inducing with it a substantial quantity of slurry. This serves to present a relatively large amount of surface of solution to the reduced pressure vapor in the interior of freezer vessel 10. Since the pressure of the vapor in the interior of freezer vessel 10 is substantially at the vapor pressure of the solution i.e., brine in the freezer, rapid evaporation of water takes place from the brine. The rapid evaporation of water vapor from the brine cools the brine. The heat of vaporization is removed from the freezer vessel through line 60 by the removal of this water vapor to absorber 14. The cooling of the brine results in some of the solvent, or in other words the water component of the brine, being frozen out of the solution in the freezer. Since the slurry within the freezer is constantly agitated by being induced upwardly by the discharge of the brine through nozzles 29, inherent metastability of the brine is greatly reduced. This inherent metastability is still further reduced by the contact of ice crystals with the cooled solution as it is fountained upwardly in the freezer. The apparatus and process described results in highly efficient and effective freezing of water from the brine in a relatively compact freezer and produces a substantial quantity of ice in the freezer which falls back into the slurry and becomes a part thereof.

While the operation of separation column 11 has been described in detail with respect to an ice and brine slurry, it will be appreciated that the solid and liquid component of any slurry may be separated in such a column with equal feasibility. Since the solid component material is forced through the separation column by hydraulic pressure, it is not necessary that it have any particular density with respect to the liquid component and that a separation column of the type described offers a highly practical solution to the problem of separating large quantities of slurry into its solid and liquid components.

It, therefore, will be understood that this invention is not limited to the embodiment described herein, but that it may be otherwise practiced within the scope of the following claims.

We claim:

1. A process for separating dissolved salts from a solvent solution thereof comprising the steps of passing said solution to a freezing vessel; freezing solvent out of the solution by evacuating said vessel to the vapor pressure of the solution and removing evaporated solvent and its attendant heat of vaporization from the vessel by contacting solvent vapor with an absorbing medium, thereby diluting the aborbing medium; passing a slurry of solution and frozen solvent from said vessel to a separation column; consolidating said frozen solvent in said separation column into a mass of relatively low permeability and hydraulically moving said relatively low permeability mass of frozen solvent through said separation column in a predetermined direction by first passing liquid solvent concurrently with the frozen solvent to produce a pressure drop and then withdrawing separated solvent solution from said separation column through a portion of said mass; reconcentrating diluted absorbing medium by passing it to a regenerator and heating the diluted absorbing medium to fractionally distill and separate absorbing medium from absorbed solvent; returning reconcentrated absorbing medium for absorption of additional solvent vapor; passing solvent distilled from the diluted absorbing medium through the separation column in counterflow relation to the movement of slurry therethrough to wash solution from the surfaces and interstices of the frozen solvent; passing the separated and washed frozen solvent to a melting vessel and melting the frozen solvent to recover purified solvent liquid.

2. A method for separating dissolved salts from a solvent solution thereof comprising the steps of passing said solution to a vessel; freezing solvent out of the solution by evacuating said vessel to the flash pressure of the solution and removing flashed solvent including the heat of vaoprization thereof from the vessel by contacting solvent vapor with an absorbing medium, thereby diluting the absorbing medium; passing a slurry of solution and frozen solvent from said vessel to a separation column; consolidating said frozen solvent in said separation column into a mass of relatively low permeability and hydraulically moving said relatively low permeability mass of frozen solvent through said separation column in a predetermined direction by creating a pressure drop through the consolidated mass by first passing liquid component concurrently with the frozen solvent and then by withdrawing liquid component of said slurry from said separation column; reconcentrating diluted absorbing medium by passing it to a regenerator and heating the diluted absorbing medium to fractionally distill and separate absorbing medium from absorbed solvent; returning reconcentrated absorbing medium for absorption of additional solvent vapor; and harvesting the separated frozen solvent from the separation column.

3. A process as defined in claim 2 including the step of passing the separated frozen solvent to a melting vessel and melting the frozen solvent in said melting vessel to recover purified liquid solvent.

4. A process as defined in claim 2 including the step of passing a washing fluid over the surfaces of said frozen solvent in counterflow relation to the direction of movement of frozen solvent in said separation column.

5. In an apparatus for separating the solid and the liquid components of a slurry: a vertically disposed separation column; means to introduce said slurry into said column; means to consolidate said solid component into a relatively impervious mass of solid component and to move said mass of solid component through said separation column by hydraulic pressure, including means to pass liquid through said solid component at least partially in a desired vertical direction of movement of said solid component through said separation column and means to withdraw said liquid at a location intermediate the ends of said separation column to provide a pressure drop through said mass of solid component thereby hydraulically forcing the mass to move in said desired direction through said separation column independently of buoyant force.

6. A method of operating a separation column for the separation of a solid and a liquid component of a slurry, comprising the steps of: introducing a slurry of said solid and said liquid components into said spearation column; withdrawing liquid component from said separation column through said slurry, at least partially in the desired direction of movement of solid component through said column, at a location intermediate the ends of said column to consolidate the solid component into a mass having relatively low permeability and to provide a pressure drop through the mass of solid component thereby moving the solid component through said separation column in said desired direction; and removing the solid component from said separation column separately from said liquid component.

7. An apparatus as defined in claim 5 including means to pass a washing fluid downwardly through said relatively impervious mass of solid component in the column in counterflow to the movement of solid component up through the column to wash a portion of the remaining liquid component from the mass of the solid component.

8. A method of operating a separation column as defined in claim 6 including the step of passing a washing fluid over the surfaces of the solid component in said separation column in counterflow to the direction of movement of said solid component therein.

9. A method of operating a separation column as defined in claim 6 including the step of intermittently passing a washing fluid over the surfaces of the solid component in said separation column in counterflow to the direction of movement of said solid component therein.

10. A separation column for separating the solid and the liquid component of a slurry comprising a tubular body, an inlet opening adjacent one end of the separation column for admitting slurry into said column, an outlet opening adjacent said one end of said column for removing said liquid component of said slurry from said column, filter means disposed between said inlet opening and said outlet opening and being adapted to inhibit movement therethrough of said solid component when said separation column is in operation, a discharge opening adjacent the other end of said column for removing the said solid component of said slurry from said separation column, and means to supply said slurry to said column through said inlet opening under a pressure greater than the liquid head in said column so that in operation the solid component of slurry admitted into said column consolidates into a mass of relatively low permeability at said one end thereof and said liquid component is forced under pressure through said mass and through said filter means out said outlet means thereby exerting a hydraulic force on said mass to move it through said column toward said discharge opening.

11. A separation column as defined in claim 10 wherein said inlet opening comprises a substantially funnel shaped duct having an open mouth extending within said tubular body and said filter means comprises a relatively fine mesh wire screen surrounding the opening mouth of said duct and extending radially to the inner wall of said body.

12. A separation column as defined in claim 10 further comprising means to pass a washing fluid over said mass of solid component in counterflow relation to the movement of solid component through said separation column to replace liquid component adhering to the surfaces of said solid component to thereby effect more complete separation of said components.

13. A method of separating the solid and liquid components of a slurry comprising the steps of introducing the slurry into a separation column under pressure; consolidating the solid component of said slurry in said separation column into a mass having a relatively low permeability; producing a pressure drop through the consolidated mass of solid component sufficient to move said consolidated mass of solid component through said column by withdrawing liquid component through said consolidated mass in a predetermined desired direction of movement thereby creating a hydraulic pressure causing said solid component to also move through said column in said predetermined direction; and harvesting said solid component at a region remote from the region of withdrawal of said liquid component.

14. In an apparatus for separating the solid and the liquid components of a slurry, a separation column for containing and separating the components of said slurry; means to introduce said slurry into said separation column under pressure, means to consolidate said solid component into a mass having a relatively low permeability, including means to withdraw the liquid component of said slurry from said separation column, concurrently with a predetermined desired direction of movement of solid component, thereby causing a pressure drop across a portion of the consolidated solid component in said column, so that said solid component is forced through said column in said predetermined direction due to the force exerted on said mass of solid component by the difference in pressure thereacross; and means to collect said solid component which has passed through said separation column.

15. In an apparatus for separating the solid and liquid components of a slurry, a separation device for containing and separating the components of said slurry, means to introduce said slurry into said separation device; means to pass liquid component of said slurry concurrently through the solid component thereof to consolidate said solid component into a mass having relatively low permeability and to provide a pressure drop across said mass to move said mass to solid component through said device in a predetermined direction, means to pass a washing liquid through said consolidated mass of solid component in counterflow relation to the movement of said solid component in said device to wash adhering liquid component from said solid component, means to withdraw said washing liquid through the consolidated mass of solid component, and means to collect the washed solid component from said separation device.

16. In a system of the type described for the conversion of saline water to potable water comprising a vacuum freezer vessel, the combination of means to maintain a predetermined level of an ice brine slurry in said freezer vessel, header means disposed within said freezer vessel, a plurality of upwardly directed nozzles communicating with said header and disposed below said predetermined level of slurry in the freezer vessel, and means to force a brine solution to said header and through said nozzles under sufficient pressure to induce an upward movement of slurry and brine solution above said predetermined level in said freezer.

17. In a freezer vessel for use in separating solvent from solute in a solution thereof contained within said freezer vessel, an upwardly directed nozzle adjacent a lower portion of said freezer vessel for admitting solution to said vessel, said nozzle being disposed in said freezer vessel below the level of the solution therein, means to evacuate said freezer vessel to the vapor pressure of the solution therein, and means to supply solution to said freezer vessel through said nozzle under a pressure sufficient to force said solution a substantial height above above said level of the solution therein.

18. A freezer a defined in claim 17 including means to automatically maintain a predetermined level of solution in said freezer vessel.

19. In a separation system, a freezer vessel adapted to contain a solution of solute and solvent; means to freeze a portion of solvent in said freezer vessel from said solution comprising means to reduce the pressure on said solution in said freezer vessel to the vapor pressure of said solution; a plurality of nozzles submerged below the level of solution of said freezer vessel, said nozzles being directed upwardly in said freezer vessel; and means to supply said solution under pressure to said freezer vessel through said nozzles, said pressure being sufficient to force solvent issued from said nozzles upwardly in said freezer vessel a substantial height above said predetermined level of solution and to induce upwardly a substantial quantity of solution in said freezer vessel above said predetermined level.

20. In a separation system comprising a freezer vessel and a separation device, said freezer vessel comprising a vertically disposed shell, means to evacuate said freeze vessel to the vapor pressure of said solution to remove heat from said solution and to freeze a portion of said solvent from said solution thereby producing a slurry of frozen solvent and solution in said freezer vessel, a plurality of upwardly extending nozzles disposed with said freezer vessel submerged below the level of slurry therein, means to pass a portion of said slurry to said separation device, said separation device serving to at least partially separate said frozen solvent from said solution, and means to return solution separated from said slurry from said separation device to said freezer vessel through said submerged nozzles under sufficient pressure to force said separated solution upwardly above the level of the slurry in said freezer vessel to induce upwardly above said level a substantial quantity of slurry thereby promoting freezing of additional solvent from the solution by enlarging the surface area thereof in contact with reduced pressure and by contacting the cooled solution with frozen solvent crystals and agitating said solution to reduce metastability thereof.

21. In a method of separating the solvent and the solution, the steps consisting of admitting solution to a freezer vessel, producing a slurry of solution and frozen solvent in the freezer vessel by evacuating the freezer vessel to the vapor pressure of the solution to remove heat from the solution and freeze solvent therefrom, and promoting freezing of additional solvent from the solution by admitting additional solution to the freezer vessel under pressure sufficient to creat a fountain of solution and slurry rising above the surface of the solution in the freezer vessel.

22. In a method of separating the solvent and the solute components of a solution in a freezer vessel, the steps consisting of freezing solvent from the solution in the freezer vessel by maintaining the pressure within said freezer vessel at substantially the vapor pressure of the solution therein, removing heat from the solution by withdrawing vaporized solvent from said vessel thereby forming a slurry of solution and frozen solvent in said freezer vessel, and reducing inherent metastability of the cooled solution in said freezer vessel while simultaneously increasing the surface of solution presented to the reduce pressure within said freezer vessel by introducing solution into said vessel in a direction and under a pressure sufficient to cause said solution to be project upwardly above the level of solution in said freezer vessel from a region below the level of slurry in said freezer thereby also inducing a substantial quantity of slurry upwardly with the solution being introduced.

23. A method of separating the solvent and solute components of a solution as defined in claim 22 including the step of automatically maintaining the level of slurry in the freezer vessel.

24. In an apparatus for rendering a saline solution potable including a separation column, means for introducing a slurry of ice and brine into said separation column, means to withdraw the brine constituent of said slurry at a predetermined location from said separation column to consolidate the ice constituent of said slurry into a mass having a relatively low permeability thereby creating a pressure drop across the low permeability mass of ice, said brine constituent of said slurry being withdrawn through said consolidated mass of ice at least partially concurrently with a desired direction of movement of ice through said column, and said mass of solid component being thereby moved through said column in said predetermined desired rectiion by the difference in pressure thereacross.

References Cited in the file of this patent

UNITED STATES PATENTS

| 2,315,762 | Ax et al. | Aug. 6, 1943 |
| 2,683,178 | Findlay | July 6, 1954 |

FOREIGN PATENTS

| 70,507 | Norway | June 3, 1946 |
| 985,905 | France | Mar. 21, 1951 |

OTHER REFERENCES

"Carrier Publication," Office of Saline Water Research and Development Progress Report Number 23, pages 1–3 and Figures 1 and 2, January 1959.

UNITED STATES PATENT OFFICE
CERTIFICATE OF CORRECTION

Patent No. 3,070,969                          January 1, 1963

Carlyle M. Ashley et al.

It is hereby certified that error appears in the above numbered patent requiring correction and that the said Letters Patent should read as corrected below.

Column 2, line 7, for "larger" read -- large --; line 48, after "column" strike out the comma; column 3, line 32, for "presure" read -- pressure --; line 62, for "brackisk" read -- brackish --; column 4, line 21, for "comprise" read -- comprises --; line 31, for "provide" read -- provides --; column 5, line 30, after "110" insert -- will --; column 9, line 69, for "fall" read -- falls --; column 10, line 71, after "under" insert -- a --; column 11, line 15, before "brine" strike out "the"; line 72, for "for" read -- of --; column 13, line 27, for "opening" read -- open --; column 14, line 2, for "to", second occurrence, read -- of --; line 33, strike out "above", second occurrence; line 60, for "with" read -- within --; column 15, line 2, before "solution", first occurrence, insert -- solute components of a --; line 9, for "creat" read -- create --; line 23, for "reduce" read -- reduced --; lines 25 and 26, for "project" read -- projected --; line 28, after "freezer" insert -- vessel --; column 16, lines 16 and 17, for "directiion" read -- direction --.

Signed and sealed this 24th day of September 1963.

(SEAL)
Attest:

ERNEST W. SWIDER

Attesting Officer

DAVID L. LADD

Commissioner of Patents